Jan. 4, 1966    G. HAYWARD ETAL    3,227,996
SOUND-PRODUCING SYSTEM AND APPARATUS
Filed June 14, 1962    4 Sheets-Sheet 1

GARY HAYWARD
HAROLD E. EDGERTON
INVENTORS

BY Cadwallader And Kelly

ATTORNEYS

Jan. 4, 1966

G. HAYWARD ETAL 3,227,996

SOUND-PRODUCING SYSTEM AND APPARATUS

Filed June 14, 1962

GARY HAYWARD
HAROLD E. EDGERTON
*INVENTORS*

BY *Cadwallader And Kelly*

ATTORNEYS

Jan. 4, 1966   G. HAYWARD ETAL   3,227,996
SOUND-PRODUCING SYSTEM AND APPARATUS
Filed June 14, 1962   4 Sheets-Sheet 3

GARY HAYWARD
HAROLD E. EDGERTON
INVENTORS

BY Cadwallader And Kelly
ATTORNEYS

Jan. 4, 1966 G. HAYWARD ETAL 3,227,996
SOUND-PRODUCING SYSTEM AND APPARATUS
Filed June 14, 1962 4 Sheets-Sheet 4

GARY HAYWARD
HAROLD E. EDGERTON
INVENTOR.

BY *Cadwallader And Kelly*

ATTORNEYS 3,227,996
SOUND-PRODUCING SYSTEM AND APPARATUS
Gary Hayward, St. Louis, Mo., and Harold E. Edgerton, Cambridge, Mass., assignors to Edgerton, Germeshausen & Grier, Inc., a corporation of Massachusetts
Filed June 14, 1962, Ser. No. 202,450
8 Claims. (Cl. 340—8)

The present invention, though having fields of more general usefulness in underwater echo systems, is particularly related to an electric-energy sound-producing system in which the discharge of an electric condenser is employed for such purposes as to produce a single sound or a repetition of sounds of short duration and high intensity, as in underwater seismic profiling.

Present underwater echo ranging systems utilize various types of sound-producing devices such as electric-spark discharge transducers, repeatable acoustic-seismic sources utilizing explosive combustion of propane-oxygen mixtures, crystal transducers, magnetostrictive transducers and mechanical transducers. Each of these has disadvantages limiting its usefulness in various applications. Thus, the disadvantages of the electric-spark discharge transducer, commonly called the "Sparker," are that it operates at frequencies generally too high for effective underwater subbottom survey work; that its efficiency is too low; that its operating voltages, ranging from 10 to 20 kilovolts, are dangerously high; and that it produces multiple pulses due to oscillation of the gas bubble that is formed by the spark. An obvious disadvantage of the repeatable acoustic-seismic source is that a supply of oxygen and propane gases must often be maintained in out-of-the-way places. The major disadvantage of crystal magneto-strictive transducers is that each is limited in the amount of power it can handle, especially for the low frequency pulses required for penetration of the bottom. The mechanical transducer is difficult to time which may exclude correlation techniques.

The system and apparatus disclosed in our co-pending application, Serial No. 36,065, now abandoned, filed June 14, 1960, discloses apparatus wherein a disk of conductive non-magnetic material is disposed adjacent a planar coil through which a charged condenser is discharged. The changing magnetic lines of force created around the coil by the discharge current, create eddy currents in said conductive disk which produce magnetic fields that tend to oppose the magnetic fields created around said coil. The force of repulsion between said magnetic fields is sufficiently great to accelerate the disk away from said coil with great force. However, only the changing magnetic field on one side of said planar coil is utilized to create sound. Thus, optimum utilization of the energy stored in the discharge capacitor is not realized; that is, maximum sound power per unit of energy delivered by said discharge capacitor is not obtained. Also it has been found that the unsymmetrical forces created cause severe damage to the coil assembly.

It is, therefore, an object of this invention to provide a new and improved electro-acoustical transducer that shall produce optimum sound power per unit of electrical energy used.

Another object of this invention is to provide an electro-acoustical transducer that shall be simple and rugged in construction, easily operable and thoroughly reliable in operation.

Another object of the invention is to provide an electro-acoustical transducer that shall operate at relatively low sound frequencies.

A further object of the invention is to provide an electro-acoustical transducer that utilizes the cavitation phenomenon to produce sound.

Another object of the invention is to provide a sound-producing system which is substantially unlimited in its power-handling capacity.

A further object of the invention is to provide an underwater sound-producing system useful in surveying subbottom structures underlying water-covered areas.

The above objects are achieved in accordance with the invention by using a sound-producing system having an electro-acoustical transducer provided with means for suddenly producing powerful, rapidly-changing opposing magnetic fields and moveable bodies responsive to the force of magnetic repulsion between said opposing magnetic fields, said bodies being initially rapidly accelerated. Highly resilient means having relatively great stiffness may be provded to decelerate said bodies and then to accelerate them back to their original positions. The latter acceleration of said bodies is sufficiently great to produce cavitation sound frequencies of great power. On the other hand, resilient means having much less stiffness may be utilized to slowly stop and return said bodies to their original positions. In this event, the rapid initial acceleration of said bodies produces a sound wave of great acoustical power.

Other objects and a fuller understanding of the invention may be had by referring to the following description and claims, taken in conjunction with the accompanying drawings, in which:

Figure 1:
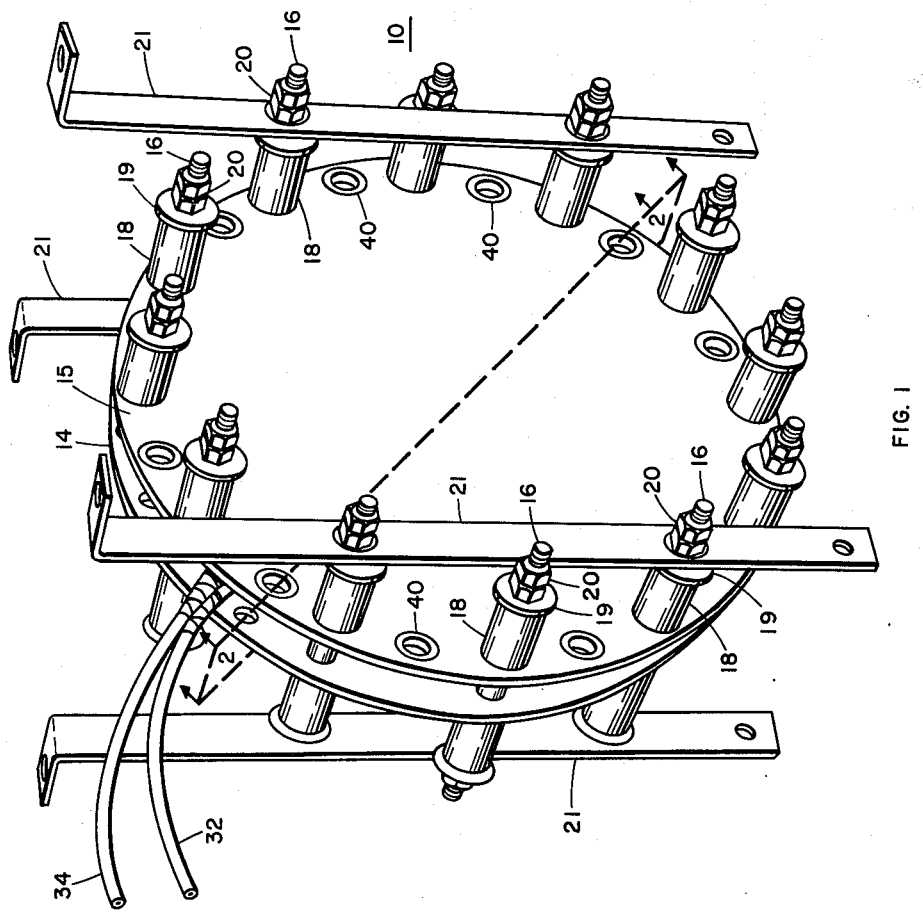
FIGURE 1 is a perspective view of an electro-acoustical transducer incorporating said invention.
Figure 2A:
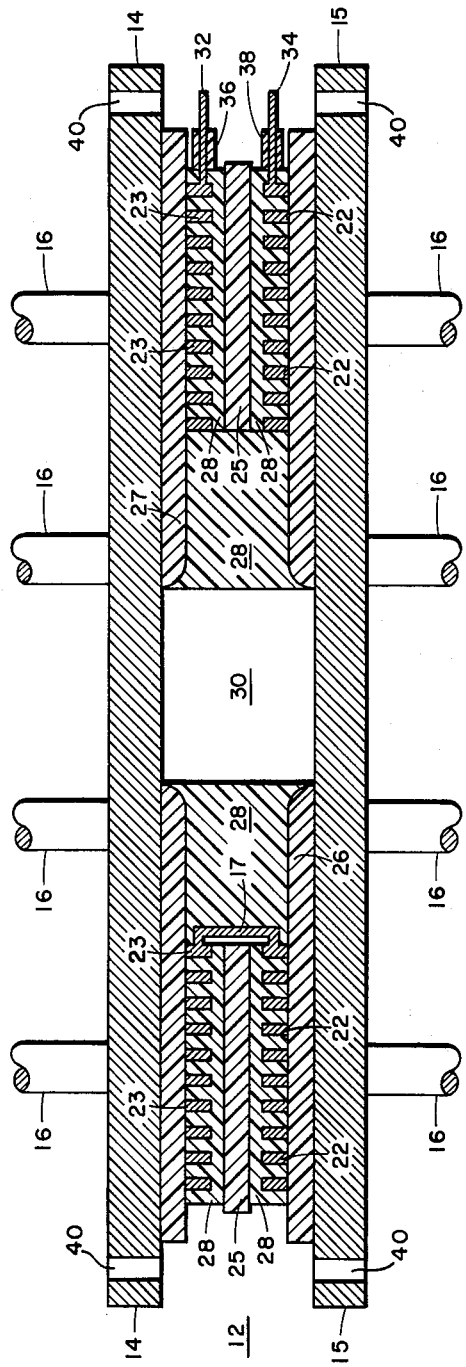
FIGURE 2A is a cross-sectional view, in part, taken along plane 2—2 of FIGURE 1 and looking in the direction of the arrows.

Referring to FIGURES 1 and 2A, electro-acoustical transducer 10 comprises coil assembly 12 sandwiched between disks 14 and 15 by means of long resilient washers 18, metal washers 19, guide rods 16, and nuts 20. Note that in FIGURE 1 a total of twelve sets of washers 18 and 19, guide rods 16 and nuts 20 are illustrated as fastening disks 14 and 15 together. If desired, more sets may be used by mounting the same through holes 40. Thus, as illustrated in FIGURE 1, a total of twenty-four sets could be used to fasten disks 14 and 15 together. Support hangers 21, fastened to the assembly in the manner illustrated, are utilized to suspend electro-acoustical transducer 10 from a ship by means of a steel cable (not shown). When disks 14 and 15 accelerate outward away from coil assembly 12, they compress long resilient washers 18. Resilient washers 18 may be selected to have either a low or a high stiffness. Thus, if washers 18 are made of neoprene they will have a sufficiently high stiffness to be so compressed and to immediately expand, forcing disks 14 and 15 to accelerate back to their positions of rest. If resilient washers 18 have a low stiffness, they slowly stop disks 14 and 15 and slowly return them to their original poitions. Disks 14 and 15 may be made of any suitable conductive non-magnetic material, such as aluminum.

Figure 2B:
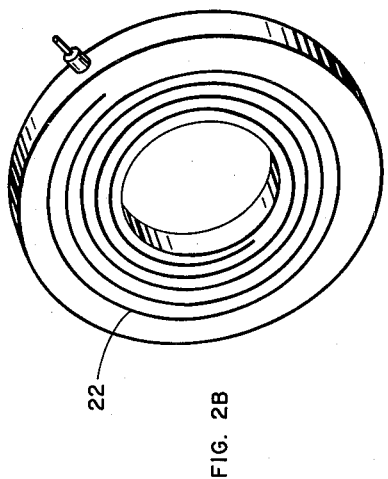
FIGURE 2B is a perspective view of a component of the apparatus illustrated in FIGURE 2A.

Coils 22 and 23 in coil assembly 12 are spiral windings. They may be wound with any wire of suitable size, such as, for example, cotton covered copper ribbon 0.25 inch wide by 0.025 inch thick, more or less. It is important that coils 22 and 23 be wound in a uniform symmetrical spiral to assure that a uniform and symmetrical magnetic field is produced around each of them during operation. They are further wound in such a manner that when placed in the assembly as illustrated, each element of coil 22 is exactly opposite a corresponding element of coil 23. Moreover, coil assemblies 22 and 23 may be pre-cast in any non-magnetic, electrically insulative epoxy resin 28 having suitable physical strength and adhesive characteristics. A suitable epoxy resin 28 may be comprised of a mixture of Emerson-Cummings A-21 filler and of sufficient Emerson-Cummings W-19 epoxy just to wet the filler particles. This mixture has great strength and hardness and has been successfully utilized in equipment used on ocean-mapping expeditions. Note that one edge of the wire with which coil 22 is wound defines a planar surface and is visible after coil 22 is pre-cast, as illustrated in FIGURE 2B. Coil 23 is pre-cast in the same manner.

Coil assembly 12 is assembled as follows. Coil 22 is fastened to the top surface of electrically insulating annulus 26 which may be of Bakelite and on the order of about $\frac{1}{16}$ inch thick. A suitable adhesive such as Eccobond 45, is used. An electrically insulating annulus 25, which may be made of Bakelite, is then adhered to the top surface of pre-cast coil 22 by means of an adhesive suc has Eccobond 45. Pre-cast coil 23 is then adhered to the top surface of annulus 25 using a similar adhesive. Coils 22 and 23 are then permanently interiorly connected by means of conductive loop 17. The interior cylindrical cavity formed by coils 22 and 23 and annuli 25 and 26 is then filled with a suitable epoxy, leaving cylindrical cavity 30, as illustrated. Before this epoxy resin hardens, insulating annulus 27 is pressed down upon it and is fastened to the top surface of coil 23 by a suitable adhesive such as Eccobond 45. Note that insulating annuli 26 and 27 are thin, on the order of $\frac{1}{16}$ inch or less, so that the coupling between coils 22 and 23 and annuli 26 and 27 respectively is very close. Insulating sleeves 36 and 38 may be fastened to pre-cast coils 22 and 23 around leads 32 and 34 by means of a suitable adhesive such as Eccobond 45 at this time, or, if desired, when said coils are pre-cast. After the epoxy resin 28 has set, coil assembly 12 is ready to be assembled into electro-acoustical transducer 10. The method of assembling electro-acoustical transducer 10, upon completion of coil assembly 12, will be apparent upon inspection of FIGURE 1.

Figure 3:
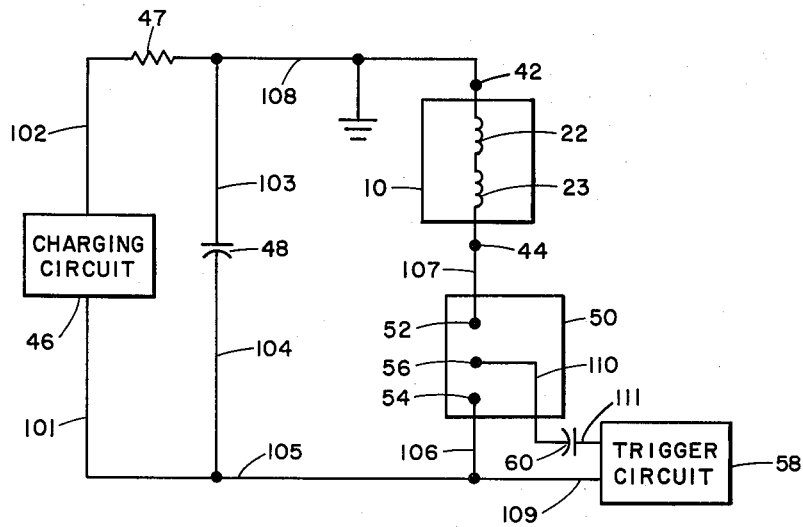
FIGURE 3 is a schematic diagram of a circuit according to which the electro-acoustical transducer of the present invention is operated.

Referring now to FIGURE 3, electro-acoustical transducer 10 is illustrated as connected in circuit at terminals 42 and 44 in an electric system such as disclosed in U.S. Letters Patent No. 2,478,906 issued on August 16, 1949 to the said Harold E. Edgerton. The circuit for charging discharge condenser 48 may be traced from charging circuit 46 through conductor 102 to charging resistor 47 through conductor 103 to discharge condenser 48 through conductors 104 and 101 back to charging circuit 46. Discharge condenser 48 discharges through conductors 104, 105, 106, three-electrode spark gap 50 (when energized), conductor 107, coils 23 and 22 (connected in series, magnetically aiding), and conductors 108 and 103, back to condenser 48.

Spark gap 50 has two principal electrodes 52 and 54 and a starting electrode 56. Starting electrode 56 is connected to trigger circuit 58 through conductor 110, trigger capacitor 60 and conductor 111. Principal electrode 54 is connected to trigger circuit 58 through conductors 106 and 109.

When discharge condenser 48 is charged, its full electrical potential appears across principal electrodes 52 and 54 of non-ionized spark gap 50. This electrical potential is not sufficiently great to cause ionization of the gas in spark gap 50 so as to cause conduction between principal electrodes 52 and 54. However, when the trigger circuit 58 is triggered, the voltage across trigger capacitor 60 is applied across starting electrode 56 and principal electrode 54, the gas therebetween is ionized, breakdown occurs, and spark gap 50 conducts between principal electrodes 52 and 54. Thereupon, condenser 48 discharges through spark gap 50 and coils 22 and 23. The initial pulse of discharge current through coils 22 and 23 may be very large, upon the order of several thousands of amperes of peak current, and occurs within a very short period of time, on the order of one millisecond or less. This rapidly changing current in coils 22 and 23 produces rapidly changing, aiding magnetic fields around coil assembly 12. Referring now to FIGURE 1, the rapidly changing magnetic field of coil assembly 12 induces eddy currents in disks 14 and 15 which in turn produce magnetic fields that oppose the magnetic fields of coil assembly 12.

The forces of magnetic repulsion between said opposing magnetic fields cause disks 14 and 15 to accelerate away from coil assembly 12 so rapidly that, in air, a sound like the report of a cannon is produced. It is estimated that in sea water, disks 14 and 15 move less than one-half inch. Resilient washers 18 may be selected to have sufficient stiffness to decelerate disks 14 and 15, to stop them, and to accelerate them back with great force to their unenergized position in surface-to-surface contact with coil assembly 12. Such washers 18 may be made of neoprene.

Figure 4A:
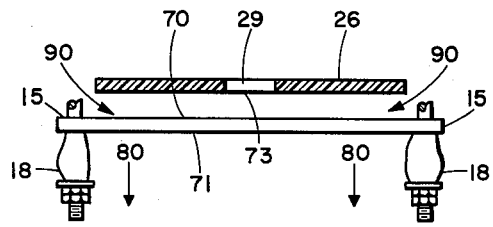
FIGURES 4A and 4B are useful in explaining the sound-producing mechanisms thought to be operative.

Referring now to FIGURE 4A, as disk 15 accelerates away from anulus 26 of coil assembly 12 in the direction of arrows 80, a vacuum is created which is immediately filled with water entering in the direction of arrows 90.

Figure 7:
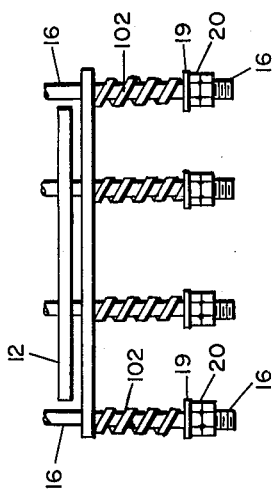
FIGURE 7 illustrates a further modification of the embodiment of FIGURES 1, 2A and 2B.

If resilient washers 18 are selected that have low stiffness, disk 15 accelerates rapidly, is slowly stopped by washers 18 and is slowly returned to its original position. A sound wave of great acoustical power is produced by the acceleration of disk 15. It will be appreciated by those skilled in the art that washers 18 of low stiffness may be replaced by springs 102 of low stiffness as illustrated schematically in FIGURE 7. As an alternative, a single center mounted bolt and springs not shown, may be used, if desired.

Figure 4B:
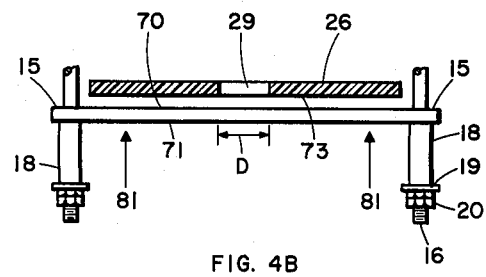

On the other hand, washers 18 may be selected that have high stiffness, such as neoprene washers. Again referring to FIGURE 4A, disk 15 accelerates away from annulus 26 and a vacuum is created which is immediately filled with water entering in the direction of arrows 90. It is observed that gases or vapors are also created which form cavities between surfaces 70 and 73 that collapse when disk 15 is completely decelerated by washers 18. As disk 15 accelerates back to its original position, as illustrated in FIGURE 4B, vapor filled cavities are again formed, now behind surface 71 of disk 15. When disk 15 reaches its rest position these cavities also collapse. The net effect of the collapse of the foregoing described cavities is the production of very large impulsive pressures having low sound frequencies of great acoustical power. The foregoing pressures are so great and are so located that pin holes are blown through disk 15 in the area designated D in FIGURE 4B. The burrs produced on surface 70 at such pin holes are sufficiently large that, but for cavity 30 (see FIGURE 2A), they would prevent close magnetic coupling between disk 15 and coil 22. Moreover, said burrs would seriously damage annulus 26.

Figure 6A:
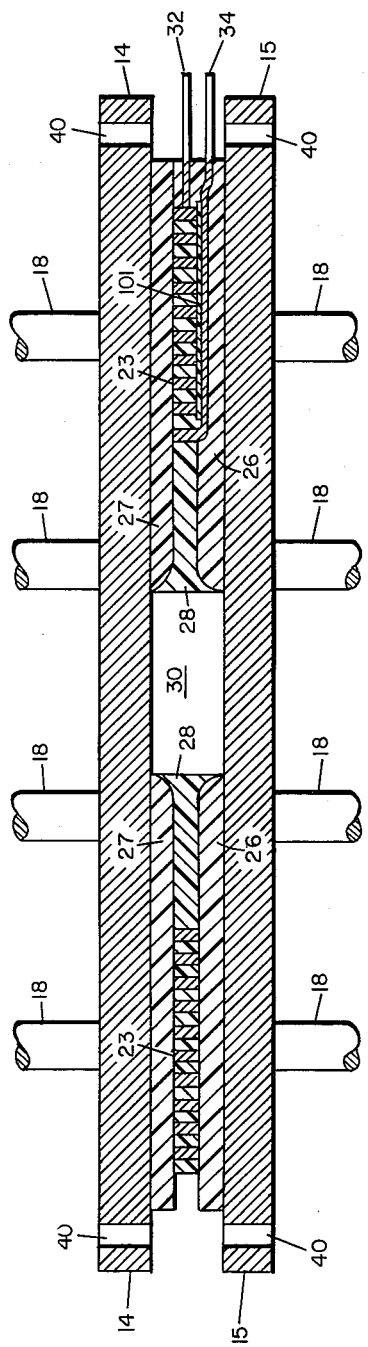
FIGURES 6A and 6B illustrate a modification of the embodiment illustrated in part in FIGURES 2A and 2B.
Figure 6B:
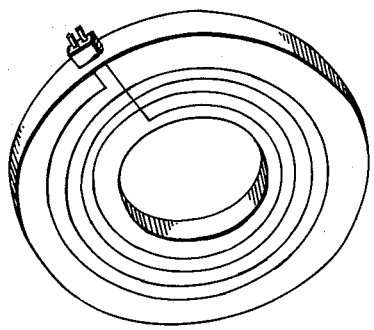

Although two planar coils 22 and 23 are illustrated in FIGURE 2A, one such coil as illustrated in FIGURES 6A and 6B may be used. The construction will be apparent to those skilled in the art after perusal of the description herein of the construction illustrated in FIGURE 2A. Note that insulator 101 insulates outgoing lead 34 from the remainder of coil 23. Obviously, a plurality of coils may be used. The number of coils to be used depends on the frequency desired for the output sound wave. Generally, this frequency is inversely related to the inductance in the capacitor discharge circuit; that is, the greater the inductance, the smaller the frequency of the sound wave.

It will be apparent that through the use of two accelerating disks 14 and 15 the amount of sound power produced has been optimized since the changing magnetic field on both sides of planar coil assembly 12 is utilized. Moreover, the assembly is simple and rugged in construction. In addition, the sound wave produced is of sufficiently low frequency that it will penetrate to various sedimentary sub-layers, resulting in reflections to the surface which can be detected, recorded, and used in underwater surveys, as in oil explorations. Further, the symmetrical forces acting on coil assembly 12 serve to reduce damage thereto. The gage of the wire used in coils 22 and 23 and the coil dimensions may be increased so that huge quantities of electrical energy can be discharged therethrough.

Figure 5A:
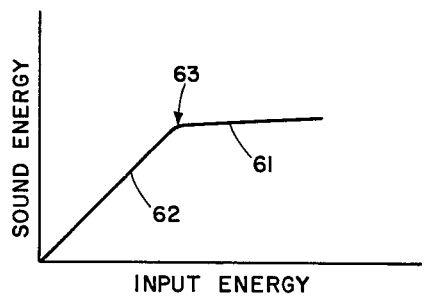
FIGURES 5A and 5B are graphs illustrating the effect of cavitation on crystal transducers and on the system of one embodiment of the present invention.
Figure 5B:
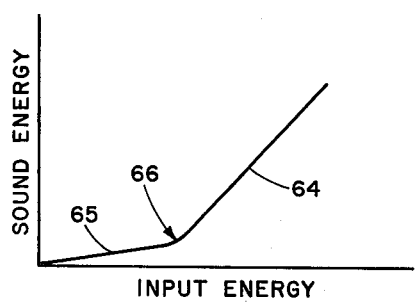

Referring now to FIGURE 5A, the relative sound energy produced per unit of input energy for crystal transducers is illustrated along curve 62, 61. At point 63, the knee of the curve, cavitation sets in and severely limits output sound energy. This is not the case for the embodiment of our invention in which washers 18 having high stiffness are utilized, as is illustrated in FIGURE 5B. Little output energy is produced along curve 65 until cavitation point 66 is reached. At this point, this embodiment takes advantage of cavitation. The sound energy produced per unit of input energy is greatly increased. The total sound energy output continues to increase as input energy increases. The upper limit on the amount of input energy is a practical one, being that at which the cavitation-produced pressures are so great as to damage the apparatus.

Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

We claim as our invention:

1. An underwater electro-acoustical transducer system comprising:
    (a) an insulated planar coil having
        (1) a first planar surface, and
        (2) a second planar surface on the side thereof opposite and parallel to said first planar surface;
    (b) a first non-magnetic conductive body having a planar surface disposed closely adjacent to said first planar surface of said coil;
    (c) a second non-magnetic conductive body having a planar surface disposed closely adjacent to said second planar surface of said coil;
    (d) resilient means for fastening said first and second conductive bodies together exteriorly of said planar coil to sandwich said coil therebetween; and
    (e) means for producing and discharging a pulse of electrical energy into said coil, which energy when so discharged induces eddy currents in said bodies and is converted into rapidly changing opposing magnetic fields between said coils and said bodies thereby causing said bodies to accelerate rapidly away from said coil in response to the force of magnetic repulsion between said opposing magnetic fields, said resilient means further having sufficient stiffness to decelerate said bodies, stop them and to accelerate them back to their original positions, said latter acceleration of said bodies being sufficiently great to produce cavitation with resulting sound of high acoustical power.

2. An underwater electro-acoustical transducer system comprising:
    (a) a coil assembly having
        (1) a plurality of insulated panar coils
            (a) disposed in parallel to each other, and
            (b) connected in series electrically and aiding magnetically,
        (2) a first planar surface parallel to said coils, and
        (3) a second planar surface on the side thereof opposite and parallel to said first planar surface;
    (b) a first non-magnetic conductive body having a planar surface disposed closely adjacent to said first planar surface of said coil assembly;
    (c) a second non-magnetic conductive body having a planar surface disposed closely adjacent to said second planar surface of said coil assembly;
    (d) resilient means for fastening said first and second non-magnetic conductive bodies together exteriorly of said coil assembly to sandwich the same therebetween; and
    (e) means for producing and discharging a pulse of electrical energy into said coil, which energy when so discharged induces eddy currents in said bodies and is converted into rapidly changing opposing magnetic fields between said coils and said bodies thereby causing said bodies to accelerate rapidly away from said coils in response to the force of magnetic repulsion between said opposing magnetic fields, said resilient means further having sufficent stiffness to decelerate said bodies, stop them, and to accelerate them back to their original positions, said latter acceleration of said bodies being sufficiently great to produce cavitation with resulting sound of high acoustical power.

3. An underwater electro-acoustical transducer system comprising:
    (a) a coil assembly having
        (1) a pair of insulated planar coils
            (a) disposed parallel to each other, and
            (b) connected in series electrically and aiding magnetically,
        (2) a first planar surface parallel to said coils, and
        (3) a second planar surface on the side thereof opposite and parallel to said first planar surface;
    (b) a first non-magnetic conductive body having a planar surface disposed closely adjacent to said first planar surface of said coil assembly;
    (c) a second non-magnetic conductive body having a planar surface disposed closely adjacent to said second planar surface of said coil assembly;
    (d) resilient means for fastening said non-magnetic conductive bodies together exteriorly of said coil assembly to sandwich the same therebetween; and
    (e) means for producing and discharging a pulse of electrical energy into said coil, which energy when so discharged induces eddy currents in said bodies and is converted into rapidly changing opposing magnetic fields between said coils and said bodies thereby causing said bodies to accelerate rapidly away from said coils in response to the force of magnetic repulsion between said opposing magnetic fields, said resilient means further having sufficient stiffness to decelerate said bodies, stop them, and to accelerate them back to their original positions, said latter acceleration of said bodies being sufficiently great to produce cavitation with resulting sound of high acoustical power.

4. An underwater electro-acoustical transducer as in claim 3 in which said resilient means comprises a plurality of guide rods each located coaxially within neoprene washers.

5. An underwater electro-acoustical transducer system comprising:
    (a) an insulated planar coil having
        (1) a first planar surface, and (2) a second planar surface on the side thereof opposite and parallel to said first planar surface;
(b) a first non-magnetic conductive body having a planar surface disposed closely adjacent to said first planar surface of said coil;
(c) a second non-magnetic conductive body having a planar surface disposed closely adjacent to said second planar surface of said coil;
(d) resilient means having low stiffness for fastening said first and second conductive bodies together exteriorly of said planar coil, to sandwich said coil therebetween; and
(e) means for producing and discharging a pulse of electrical energy into said coil, which energy when so discharged induces eddy currents in said bodies and is converted into rapidly changing opposing magnetic fields between said coils and said bodies thereby causing said bodies to accelerate rapidly away from said coil in response to the force of magnetic repulsion between said opposing magnetic fields thereby to generate an acoustical wave, with said resilient means thereafter acting to slowly return said bodies to their original positions.

6. An underwater electro-acoustical transducer system comprising:
(a) a coil assembly having
(1) a plurality of insulated planar coils
(a) disposed in parallel to each other, and
(b) connected in series electrically and aiding magnetically,
(2) a first planar surface parallel to said coils, and
(3) a second planar surface on the side thereof opposite and parallel to said first planar surface;
(b) a first non-magnetic conductive body having a planar surface disposed closely adjacent to said first planar surface of said coil assembly;
(c) a second non-magnetic conductive body having a planar surface disposed closely adjacent to said second planar surface of said coil assembly;
(d) resilient means having low stiffness for fastening said first and second non-magnetic conductive bodies together exteriorly of said coil assembly to sandwich the same therebetween; and
(e) means for producing and discharging a pulse of electrical energy into said coil, which energy when so discharged induces eddy currents in said bodies and is converted into rapidly changing opposing magnetic fields between said coils and said bodies thereby causing said bodies to accelerate rapidly away from said coils in response to the force of magnetic repulsion between said opposing magnetic fields thereby to generate an acoustical wave, with said resilient means thereafter acting to slowly return said bodies to their original positions.

7. An underwater electro-accoustical transducer system comprising:
(a) a coil assembly having
(1) a pair of insulated planar coils
(a) disposed parallel to each other, and
(b) connected in series electrically and aiding magnetically,
(2) a first planar surface parallel to said coils, and
(3) a second planar surface on the side thereof opposite and parallel to said first planar surface;
(b) a first non-magnetic conductive body having a planar surface disposed closely adjacent to said first planar surface of said coil assembly;
(c) a second non-magnetic conductive body having a planar surface disposed closely adjacent to said second planar surface of said coil assembly;
(d) resilient means having low stiffness for fastening said non-magnetic conductive bodies together exteriorly of said coil assembly to sandwich the same therebetween; and
(e) means for producing and discharging a pluse of electrical energy into said coil, which energy when so discharged induces eddy currents in said bodies and is converted into rapidly changing opposing magnetic fields between said coils and said bodies thereby causing said bodies to accelerate rapidly away from said coils in response to the force of magnetic repulsion between said opposing magnetic fields thereby generate an acoustical wave, with said resilient means thereafter acting to slowly return said bodies to their original positions.

8. An underwater electro-acoustical transducer as in claim 7 in which said means having low stiffness comprises a plurality of guide rods each located coaxially within springs.

References Cited by the Examiner
UNITED STATES PATENTS

| | | | |
|---|---|---|---|
| 363,186 | 5/1887 | Thomson | 317—168 |
| 2,081,619 | 5/1937 | Ebert. | |
| 2,543,616 | 2/1951 | Vandewege | 318—125 X |
| 2,903,673 | 9/1959 | Harris | 340—9 |

CHESTER L. JUSTUS, *Primary Examiner.*

J. W. MILLS, *Assistant Examiner.*